(12) United States Patent  
Matthews

(10) Patent No.: US 8,116,674 B2
(45) Date of Patent: Feb. 14, 2012

(54) PROFESSIONAL DEVELOPMENT SYSTEM AND METHODOLOGY FOR TEACHERS

(75) Inventor: Douglas Matthews, Jacksonville, FL (US)

(73) Assignee: Teaching Point, Inc., Jacksonville, FL (US)

( * ) Notice: Subject to any disclaimer, the term of this patent is extended or adjusted under 35 U.S.C. 154(b) by 1250 days.

(21) Appl. No.: 11/382,269

(22) Filed: May 8, 2006

(65) Prior Publication Data

US 2006/0252022 A1  Nov. 9, 2006

Related U.S. Application Data

(60) Provisional application No. 60/594,804, filed on May 9, 2005.

(51) Int. Cl.
*G09B 3/00* (2006.01)
(52) U.S. Cl. .................. 434/350; 434/219; 434/322
(58) Field of Classification Search .................. 434/350, 434/322, 323, 365; 705/28; 715/200
See application file for complete search history.

(56) References Cited

U.S. PATENT DOCUMENTS

| | | | | |
|---|---|---|---|---|
| 5,777,884 A | * | 7/1998 | Belka et al. | 700/225 |
| 6,115,642 A | * | 9/2000 | Brown et al. | 700/104 |
| 6,149,441 A | * | 11/2000 | Pellegrino et al. | 434/350 |
| 6,162,060 A | * | 12/2000 | Richard et al. | 434/118 |
| 6,282,404 B1 | * | 8/2001 | Linton | 434/350 |
| 6,289,340 B1 | * | 9/2001 | Puram et al. | 707/5 |
| 6,315,572 B1 | * | 11/2001 | Owens et al. | 434/322 |
| 6,322,366 B1 | * | 11/2001 | Bergan et al. | 434/118 |
| 6,496,681 B1 | * | 12/2002 | Linton | 434/350 |
| 6,904,263 B2 | * | 6/2005 | Grudnitski et al. | 434/308 |
| 7,043,193 B1 | * | 5/2006 | Vashi et al. | 434/353 |
| 7,162,738 B2 | * | 1/2007 | Dickinson et al. | 726/14 |
| 7,210,938 B2 | * | 5/2007 | Packard et al. | 434/365 |
| 7,631,254 B2 | * | 12/2009 | Layard et al. | 715/202 |
| 2003/0055699 A1 | * | 3/2003 | O'Connor | 705/7 |
| 2005/0208461 A1 | * | 9/2005 | Krebs et al. | 434/365 |
| 2006/0199163 A1 | * | 9/2006 | Johnson | 434/322 |

OTHER PUBLICATIONS

Harriet Talmage, Creating Instructional Materials: The Textbook Publisher as connecting Link—Three distinct types of expertise go into bringing "good" materials to our students. Each one plays a different yet essential role, Curriculum Review, Sep. 1986.*

* cited by examiner

*Primary Examiner* — Kang Hu
(74) *Attorney, Agent, or Firm* — Mark Young, PA

(57) ABSTRACT

A system and method for professional development for teachers which includes a structured framework for creating and providing online courses, qualification testing, instructional material, and mentoring teacher access, all subject specific to help teachers gain competency in their individualized teaching assignments and by extension help in the recruitment, development and retention of teachers leading to improved student achievement.

7 Claims, 16 Drawing Sheets

PROCESS STEP [Insert New Record]

| | 810<br>Stage Order | 820<br>Step Name | 830<br>Process Step Id | 840<br>Time Estimate | |
|---|---|---|---|---|---|
| Edit Delete | Planning | Create course list | 1 | 1.00 | 2 |
| Edit Delete | Planning | Create course codes | 2 | 0.10 | 2 |
| Edit Delete | Planning | Domain name(s) secured | 3 | 0.20 | 4 |
| Edit Delete | Course Addition | Author Invitation Email | 1 | 0.10 | 2 |
| Edit Delete | Course Addition | Author Form filled out on web site by Author | 2 | 0.10 | 3 |
| Edit Delete | Course Addition | Author resume received | 3 | 0.10 | 4 |
| Edit Delete | Course Addition | Author samples received | 4 | 0.10 | 5 |
| Edit Delete | Course Addition | Send Royalty Agreement with course file names | 5 | 0.10 | 6 |
| Edit Delete | Course Addition | Completed royalty agreement received | 6 | 0.10 | 7 |
| Edit Delete | Course Addition | Royalty agreement accepted | 7 | 0.10 | 8 |
| Edit Delete | Course Addition | Copy of accepted royalty agreement sent to author with cover note (original filed with company) | 8 | 0.10 | 9 |
| Edit | Course Addition | Author email, ftp folder, login and password created | 9 | 0.20 | 1 |

Figure 8

| | | | | | |
|---|---|---|---|---|---|
| Edit Delete | Course Addition | Staff Form completed | 10 | 0.20 | 1 |
| Edit Delete | Course Addition | New Product Form completed | 11 | 0.20 | 1 |
| Edit Delete | Course Addition | Custom templates created with course file names | 12 | 0.50 | 1 |
| Edit Delete | Course Addition | Welcome email sent to author with custom file named templates and handbook | 13 | 0.10 | 1 |
| Edit Delete | Course Addition | Subject relevant sample notebook, CD and student book and author handbook sent to author | 14 | 0.10 | 1 |
| Edit Delete | Standard Alignment | Standard Alignment | 1 | 24.00 | 1 |
| Edit Delete | Product Development | Tech Support, Q&A, general assistance sessions with authors | 1 | 12.00 | 2 |
| Edit Delete | Product Development | Author writes book, composes add-on files, multimedia, etc. | 2 | 0.00 | 3 |
| Edit Delete | Product Development | Create custom "Intro" page from template with author's letter | 3 | 0.10 | 4 |
| Edit Delete | Product Development | Author uploads all tabs files of "unit 1" book text (& other associated files) to FTP site | 4 | 0.00 | 5 |
| Edit Delete | Product Development | Assign Content/Format-Editor (C/F-Editor) | 5 | 0.00 | 6 |
| Edit Delete | Product Development | C/F-Editor downloads all files from FTP site & performs editing tasks | 6 | 0.00 | 7 |
| Edit Delete | Product Development | Author makes changes, posts updates to FTP site with R2 nomenclature | 7 | 0.00 | 8 |
| Edit Delete | Product Development | C/F-Editor downloads all files from FTP site & performs editing tasks | 8 | 0.00 | 9 |
| Edit Delete | Product Development | C/F-Editor posts changes to FTP site with R3 nomenclature & contacts author | 9 | 0.00 | 1 |
| Edit Delete | Product Development | Author makes changes, posts updates to FTP site with R4 nomenclature | 10 | 0.00 | 1 |
| Edit Delete | Product Development | | 11 | 0.00 | 1 |

Figure 9

| | | | | | |
|---|---|---|---|---|---|
| Edit Delete | Product Development | C/F-Editor downloads all files from FTP site & performs editing tasks | 12 | 0.00 | 1 |
| Edit Delete | Product Development | C/F-Editor posts changes to FTP site with R5 nomenclature & contacts author | 13 | 0.00 | 1 |
| Edit Delete | Product Development | Author makes changes, posts updates to FTP site with R6 nomenclature | 14 | 0.00 | 1 |
| Edit Delete | Product Development | C/F-Editor composites Tab 0a & b into Tab 0 creates PDF files for Tabs 0-6 | 15 | 0.00 | 1 |
| Edit Delete | Product Development | C/F-Editor composites Tab 1a, b & c into Tab 1 | 16 | 0.00 | 1 |
| Edit Delete | Product Development | C/F-Editor creates PDF thumbnails (6 slides per page) from all .PPT's & inserts at end of Tab 4 | 17 | 0.00 | 1 |
| Edit Delete | Product Development | C/F-Editor creates addition to Tab 4 TOC Word doc with PPT titles | 18 | 0.00 | 1 |
| Edit Delete | Product Development | C/F-Editor creates individual Tabs 0-6 PDF files (using Allied PDF definition) stores in Printer folder | 19 | 0.00 | 2 |
| Edit Delete | Product Development | C/F-Editor compares all source docs to PDF versions & corrects problems | 20 | 0.00 | 2 |
| Edit Delete | Product Development | Author ensures that the Word Docs & PDF's match and signs off (in email) | 21 | 0.00 | 0 |
| Edit Delete | Product Development | Author reviews printed proof copy & signs off (in email) that the book is acceptable | 22 | 0.00 | |
| Edit Delete | Product Development | C/F-Editor adds TOC bookmarks to all PDF files | 23 | 0.00 | |
| Edit Delete | Product Development | Choose Academic Review Board members and leader | 24 | 0.00 | |
| Edit Delete | Product Development | Academic Review Board sent course material | 25 | 0.00 | |
| Edit Delete | Product Development | Academic Review Board corrects files and sends preliminary report to TP | 26 | 0.00 | |
| Edit Delete | Product Development | TP sends ARB correction report to Author | 27 | 0.00 | |
| Edit Delete | Product Development | Author delivers corrected files to TP | 28 | 0.00 | |
| Edit | Product Development | TP sends corrected files to ARB | 29 | 0.00 | |

Figure 10

| | | | | |
|---|---|---|---|---|
| Delete | | | | |
| Edit Delete | Product Development | ARB signs off on Author response and delivers final review | 30 | 0.00 |
| Edit Delete | Product Development | Book goes to Production Stage | 31 | 0.00 |
| Edit Delete | Pre-Production | Create source artwork | 1 | 0.50 | 1 |
| Edit Delete | Pre-Production | Create book covers | 2 | 0.35 | 2 |
| Edit Delete | Pre-Production | Create book spine | 3 | 0.35 | 3 |
| Edit Delete | Pre-Production | Create workbook covers | 4 | 0.35 | 4 |
| Edit Delete | Pre-Production | Create grayscale images of notebook cover | 5 | 0.35 | 5 |
| Edit Delete | Pre-Production | Create Web Page version of book cover graphic | 6 | 0.00 | 6 |
| Edit Delete | Pre-Production | Create Web Page | 7 | 0.00 | 7 |
| Edit Delete | Pre-Production | Add Shopping Cart Functionality | 8 | 0.00 | 8 |
| Edit Delete | Production | Create course folders & 7 sub-folders for Autoplay, CD SubsVer, CD ClassVer, Covers, Word files, PPT, Printer | 1 | 0.00 | 1 |
| Edit Delete | Production | Create CD autorun background image (.bmp) | 2 | 0.10 | 2 |
| Edit Delete | Production | Create CD label - SubVer | 3 | 0.50 | 3 |
| Edit Delete | Production | Create CD label - ClassVer | 4 | 0.10 | 4 |
| Edit Delete | Production | Place Tab 0 PDF files in SubVer CD Burn Folder | 5 | 0.05 | 5 |
| Edit Delete | Production | Place PPT files in SubVer and ClassVer CD Burn Folder | 6 | 0.05 | 6 |
| Edit Delete | Production | Assign Password for PDF and Word files | 7 | 0.20 | 7 |
| Edit | Production | Password protect Tab 2, 4, 5 and 6 PDF; 2 and 5 Word files and | 8 | 0.20 | 8 |

Figure 11

| | | | | | |
|---|---|---|---|---|---|
| Delete | | copy in SubVer CD Burn Folder | | | |
| Edit Delete | Production | Copy Tab 0, 2, 4, and 5 PDF, Word docs 2 and 5 to ClassVer CD Burn folder | 9 | 0.15 | 9 |
| Edit Delete | Production | Create CD autorun packages for SubVer and ClassVer | 10 | 0.20 | 1 |
| Edit Delete | Production | Modify revision date on CD labels, then print and stomp CD Labels | 11 | 0.10 | 1 |
| Edit Delete | Production | Create CD ISO image – SubVer | 12 | 0.15 | 1 |
| Edit Delete | Production | Create CD ISO image – ClassVer | 13 | 0.20 | 1 |
| Edit Delete | Production | Burn product CDs from ISO – SubVer | 14 | 0.05 | 1 |
| Edit Delete | Production | Burn product CDs from ISO – ClassVer | 15 | 0.05 | 1 |
| Edit Delete | Production | Test all links on first-run product CD – SubVer | 16 | 0.25 | 1 |
| Edit Delete | Production | Test all links on first-run product CD – ClassVer | 17 | 0.00 | 2 |
| Edit Delete | Printing | Product book source are taken to Printer | 1 | 0.25 | 3 |
| Edit Delete | Printing | Managing Editor reviews proof copy of printed book | 2 | 0.50 | 4 |
| Edit Delete | Printing | Printer prints & binds the 1st copy for proofing | 3 | 0.00 | 0 |
| Edit Delete | Printing | Printing & binding mass production at Printer #1 | 4 | 0.00 | 0 |
| Edit Delete | Shipping | Taking Orders | 1 | 0.25 | 0 |
| Edit Delete | Revision | Modifications to all tab 0 doc's & reformat to newest revision of templates | 1 | 1.20 | 0 |
| Edit Delete | Revision | Convert (merge) authors' content format to MS-Word (from PageMaker, Tex, etc.) | 2 | 12.00 | 0 |
| Edit Delete | Revision | Modify all references to the book/product title | 3 | 6.00 | 0 |
| Edit | | | | | |

Figure 12

| | | | | |
|---|---|---|---|---|
| Delete | Revision | Authors' content changes, all documents | 4 | 8.70 | 0 |
| Edit Delete | Revision | Re-edit all documents to match the newest revision of the templates | 5 | 38.00 | 0 |
| Edit Delete | Revision | Re-create PDF files / merge documents / resolve issues | 6 | 8.70 | 0 |
| Edit Delete | Revision | Final Proof (compare PDF's to source documents & resolve discrepancies) | 7 | 14.00 | 0 |
| Edit Delete | Revision | Create grayscale versions of cover images | 8 | 0.20 | 0 |
| Edit Delete | Revision | Create new 2-up workbook cover files to save paper | 9 | 0.33 | 0 |
| Edit Delete | Revision | Revise Autoplay menu to point to only files that are on the CD (not Tab 1 & 3) | 10 | 0.25 | 0 |
| Edit Delete | Revision | Create separate Autoplays & ISO images for Subscr. & Classroom Set versions | 11 | 1.00 | 0 |
| Edit Delete | Revision | Reduce the size of the CD label image files (using graphics software) | 12 | 0.20 | 0 |
| Edit Delete | Revision | Put rev. date and ISBN # onto the CD labels (Subscr. and Classroom Set versions) | 13 | 0.33 | 0 |
| Edit Delete | Revision | Modify all CD labels (regarding subscription & included-file verbiage) | 14 | 0.50 | 0 |
| Edit Delete | Revision | Revise Autoplay menu title-bar to add or correct the Teaching-Point URL | 15 | 0.15 | 0 |
| Edit Delete | Revision | Add tabs 5 and 6 files (Word & PDF) into CD Burn folders, Autoplay menus | 16 | 0.25 | 0 |
| Edit Delete | Revision | Add Adobe bookmarks (links) similar to TOC for all PDF files | 17 | 3.00 | 0 |
| Edit Delete | Revision | Remove pointless Macintosh software plug-ins from Windows version of Autoplay | 18 | 0.15 | 0 |
| Edit Delete | Revision | Re-create & test all ISO images with a single directory path for add-on reader pgm files | 19 | 0.15 | 0 |
| Edit Delete | Revision | Create Macintosh version of Autoplay for all products (?) | 20 | 0.00 | 0 |
| Edit Delete | Revision | Replace Windows version of Acrobat Reader (ar505enu.exe) to v6 in all products | 21 | 0.30 | 0 |

Figure 13

| | | | | |
|---|---|---|---|---|
| Edit Delete | Revision | Replace Macintosh version of Acrobat Reader (ar505enu.bin) to v? in all products | 22 | 0.00 | 0 |
| Edit Delete | Revision | Replace Windows version of PowerPoint Viewer '97 to v? in all products | 23 | 0.30 | 0 |
| Edit Delete | Revision | Replace Macintosh version of PowerPoint Viewer '98 to v? in all products | 24 | 0.00 | 0 |
| Edit Delete | Revision | Capture page count (all sections, all books) & put into Product Profile DB | 25 | 0.25 | 0 |
| Edit Delete | Revision | Put page counts onto website | 26 | 0.25 | 0 |
| Edit Delete | Revision | | 27 | 0.00 | 0 |

Figure 14

PROFESSIONAL DEVELOPMENT SYSTEM AND METHODOLOGY FOR TEACHERS

RELATED APPLICATION

This application claims the benefit of priority of U.S. Provisional Application 60/594,804, filed May 9, 2005, the entire contents of which are incorporated herein.

FIELD OF THE INVENTION

This invention generally relates to systems and methods for professional development for teachers, and more particularly, to systems and methods for providing a structured framework for creating and providing online courses, instructional material, access to mentoring teachers, and qualification testing, all subject specific to help teachers gain competency in their individualized teaching assignments.

BACKGROUND

Nothing is more important to a child's success in school than having qualified and prepared teachers. However, many children do not have the benefit of a well-prepared or highly qualified teacher in the classroom.

Instructional materials are an essential component to a well-taught course. A well-planned lesson is much more likely to enhance a curriculum, enrich students, ensure adequate coverage, and make a teacher's professional life a bit easier. Unfortunately, many teachers do not have the time, resources or skills to prepare high quality instructional materials.

A instructional material should be detailed and complete enough so that another teacher knowledgeable in the subject matter could deliver lessons without needing to contact the drafter frequently. However, many instructional materials are sketchy and incomplete. Thus, a successor is often relegated to struggling with a predecessor's inadequate plan or scrapping it and starting from scratch.

Consistent, complete and comprehensive instructional materials are perhaps the most essential tool when striving to provide highly qualified instruction. Additionally, a better prepared teacher leads to improved student achievement. Because all students are entitled to a good education and are expected to pass similar standardized exams, it is imperative that instructors of a subject cover the same and depth of required topics based on state and national standards. Unfortunately, however, many teachers are not prepared or qualified to cover substantially the breadth and depth of required topics.

Not only do instructors lack access to complete subject-specific instructor-oriented course materials, they also lack access to subject-specific mentors. Ideally, a subject-specific mentoring program would provide convenient access to experts who are intimately familiar with the instructional material, and have the education and experience needed to resolve ambiguities and fill in gaps. Likewise, an instructor-oriented course would preferably be available on-demand and relate directly to the instructional material. However, as no such series of subject-specific distance learning graduate level courses or subject-specific mentoring programs exist, instructors are often relegated to learning how to teach a subject on their own and resolving issues on their own, often through trial and error or by ad hoc communication with unknown third parties over the Internet.

To address perceived shortcomings with the public education system, on Jan. 8, 2002, President George Bush signed the No Child Left Behind Act (NCLB) of 2001, which endeavors to raise academic and teaching standards. One aspect of the NCLB is instructor qualification. Each state education agency must have developed a plan to ensure that all teachers are "highly qualified" by the end of the 2005-06 school year (or by 2007 in rural areas). The plan must establish annual, measurable objectives for each local school district and school to ensure that they meet the "highly qualified" requirement. However, the credentials needed to meet the "highly qualified" requirement are unattainable to instructors in certain circumstances. In general, under the NCLB, K12 teachers must prove that they know the subject they teach with: 1) a major in the subject they teach, 2) credits equivalent to a major in the subject, 3) passage of a state-developed test, 4) according to a High, Objective, Uniform State Standard of Evaluation (HOUSSE), 5) an advanced certification from the state, or 6) a graduate degree. The invention is directed to overcoming the shortcomings of teachers in one or more of the qualifiers as set forth above.

SUMMARY OF THE INVENTION

To overcome one or more of the qualifiers as set forth above, in an exemplary implementation of the invention, a professional development system and methodology for teachers is provided. The system includes a database and a plurality of subject-specific instructional materials. Each of the instructional materials includes a syllabus, a pacing guide, complete detailed daily lesson plans, assessments, a student activity book, a teacher version of the student activity book, and class notes. The system also includes one or more of the following modules: a module for managing creation of instructional materials, a module for managing inventory of instructional materials, a module for managing inventory of instructional material supplies, a module for mentoring teachers, a module for managing creation of instructional materials, a module for delivering courses online, and a module for testing teachers.

One aspect of a system and method according to principles of the invention is a module to manage creation of instructional materials. Thus, an exemplary method according to principles of the invention includes soliciting authors and reviewers, receiving applicant information online, generating reports to compare applicants, and selecting an applicant. Steps of providing detailed instructions to retained authors, setting forth in detail requirements for the materials to be created by the author are also provided. In so doing, the instructions help ensure a consistent framework for materials prepared by various authors for various courses.

Another aspect of an exemplary method according to principles of the invention includes steps of preparing a syllabus, pacing guide and daily lesson plans, as well as a step of preparing a teacher version of a student activity book.

Another aspect of an exemplary method according to principles of the invention includes a step of tracking creation of instructional materials, including stages of completion, percentage completion, percentage remaining and/or hours remaining for a task.

Another aspect of an exemplary method according to principles of the invention includes a step of tracking inventory of instructional materials available for shipping to customers.

Another aspect of an exemplary method according to principles of the invention includes a step of tracking inventory of supplies such as paper, covers, binders, tabs and the like, as required to produce instructional materials.

Another aspect of an exemplary method according to principles of the invention includes steps of preparing draft instructional material, editing each draft of the instructional material, performing academic (peer) review and providing feedback in a peer reviewed version of the instructional material, producing a final draft of the instructional material, and performing a final editorial examination to ensures that the instructional material, including text formatting, file organization, nomenclature and graphics, are production ready.

Another aspect of an exemplary method according to principles of the invention includes a step of providing subject-specific mentoring support for educator end-users of the subject-specific instructional materials.

Another aspect of an exemplary method according to principles of the invention includes determining if an end-user teacher is qualified to teach a course using the instructional material.

BRIEF DESCRIPTION OF THE DRAWINGS

The foregoing and other aspects, objects, features and advantages of the invention will become better understood with reference to the following description, appended claims, and accompanying drawings, where:

The foregoing and other objects, aspects, and advantages will be better understood from the following detailed description of a preferred embodiment of the invention with reference to the drawings, in which:

FIGS. 8 through 14 are tables of descriptions of process steps for implementing a system and methodology in accordance with principles of the invention.

Those skilled in the art will appreciate that the invention is not limited to the exemplary embodiments, configurations, components or sequence of steps shown in the figures.

DETAILED DESCRIPTION

In an exemplary implementation, the system provides a structured framework and methodology for efficiently producing high-quality, complete and comprehensive instructional materials that have a consistent format; making the lessons plans and corresponding courses and mentoring support readily available to instructors; providing on-demand access to on-line courses and mentors for purposes of educating instructors on how to teach a subject and answering questions concerning instructional material; and providing a tool to facilitate determining whether an instructor meets the "highly qualified" requirement under any of various established options.

The scope of the invention is not limited to any particular subject, type, content or format of instructional material or course. Instructional materials may be in print, electronic or other form now known or hereafter developed. Additionally, instructional materials may employ conventional text, symbols, charts, tables, pictures, graphics, abbreviations, multimedia, codes or any other information, works of authorship and means of expression.

Figure 1:
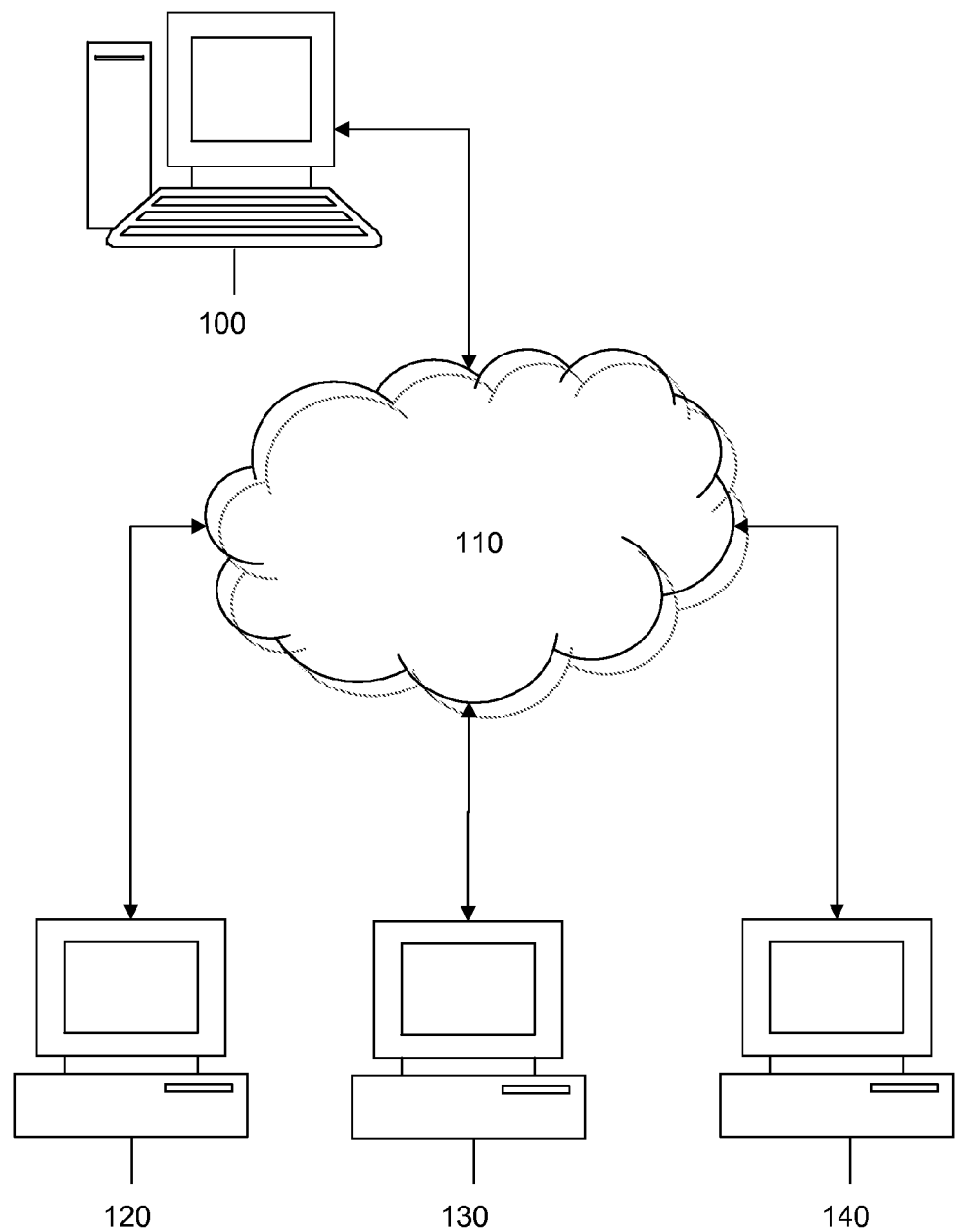
FIG. 1 is a high level block diagram of an exemplary computing and network environment for implementing a system and methodology in accordance with principles of the invention.

In an exemplary implementation, a networked computer system is employed to facilitate use by various participants. Referring to FIG. 1, an exemplary computing and network environment for implementing a system and methodology in accordance with principles of the invention is conceptually shown. Illustratively, a plurality of computing devices 120, 130 and 140 are communicatively coupled to a server 100 via network communication means 110. By way of example and not limitation, three client computers are conceptually shown. Those skilled in the art will appreciate that other configurations with fewer or more computers may be used to implement a system and methodology in accordance with principles of the invention.

In the exemplary configuration, as conceptually shown in FIG. 1, each computing device 100 and 120-140 may, for example, be a conventional computer with a processing unit, a system memory and a system bus that communicatively couples various system components including the system memory to the processing unit. The system bus may be any of several types of bus structures using any of a variety of bus architectures. The system memory may include read only memory (ROM) and random access memory (RAM). A basic input/output system (BIOS), containing routines that help to transfer information between elements within the computer may be stored in ROM. The computer may also include storage devices such as a magnetic hard disk drive, a magnetic disk drive for reading from or writing to removable magnetic disk, and an optical disk drive for reading from or writing to a removable optical disk such as a CD-ROM or other optical media. The magnetic hard disk drive, magnetic disk drive, and optical disk drive may be connected to the system bus by a hard disk drive interface, a magnetic disk drive-interface, and an optical drive interface, respectively. The drives and their associated computer-readable media provide nonvolatile storage of computer readable instructions, data structures, program modules and other data for the computer. These elements are typically included in most computer systems and the aforementioned system is intended to represent a broad category of systems supporting transmission, receipt and processing of messages.

The exemplary computer system may include fewer, different and/or additional elements, provided it is capable of performing processing steps in accordance with principles of the invention. Those skilled in the art will appreciate that the invention may be practiced with other computer system configurations, including hand-held devices, multi-processor systems, programmable equipment and machinery, minicomputers, mainframe computers, and the like. The invention may also be practiced in distributed computing environments where tasks are performed by remote processing devices that are linked through a communications network with program modules located in local and/or remote storage devices.

Aspects of the invention may also be practiced without computer systems or computer networks.

In an exemplary implementation, each computer 100 and 120-140 operates in a networked environment using logical connections to one or more other computers. By way of example and not limitation, the network may be a local area network (LAN) and/or a wide area network (WAN), including the Internet, wireless or wired, a combination of any of the foregoing, or some other means of communicating computer readable data between separate computers. Such networking environments are commonplace.

Software for implementing a system and methodology in accordance with principles of the invention may be stored on the server 100 and one or more of the client computers 120-140. The software may include an operating system, one or more application programs, other program modules, and program data. Firmware, application specific integrated circuits and other manifestations of computer processing instructions and data may be employed in lieu of or in addition to software without departing from the scope of the present invention.

As used herein, modules refer to system components configured to enable computer processing of instructions to perform determined processes and achieve determined functionality. Modules may be comprised of software, such as programs, subprograms, scripts, batch files, databases, macros, libraries, functions or other functional software components, or combinations of any or all of the foregoing. A discrete software component may perform multiple tasks, processes or functions and serve as a plurality of modules. Those skilled in the art will appreciate that the modules may be implemented as hardware or firmware. For example, programmable read only memory, application specific integrated circuits, other firmware and hardware, or other manifestations of computer processing instructions may be used to achieve determined functionality without departing from the scope of the present invention.

An exemplary implementation of a system according to principles of the invention is configured for access and use by a plurality of users. By way of example and not limitation, the users may include an author, editor, coordinator, reviewer, literary agent, author development director, managing editor, production director, pre-press manager, administrative staff member, a super-user and various others (collectively referred to as users or participants) though more or less users with different titles and different or combined roles and responsibilities may have access to the system without departing from the scope of the present invention. Thus, for example, an author may also be a reviewer.

An exemplary system according to principles of the invention includes a registration module adapted to collect participant information, create user accounts and grant permissions. Requested information may vary according to the particular type of participant. The information may include identification information (e.g., name, address, telephone numbers, email address, etc . . . ). Each account is associated with a login. Permissions (i.e., scope of permitted access) may depend upon the type of account (e.g., an author's account, or a reviewer's account or an editor's account) and may be set manually or automatically. By way of example, the system may be configured to allow only authors, editors and participants with super-user privileges to post modified versions of instructional materials to the system. Participant information may be stored in one or more databases. Participants with requisite permission may access and manage account information, such as (for example) to update contact information.

The exemplary system also includes one or more data repositories (referred to herein as a database) for saving and organizing information pertaining to the system and methodology and making the information available for analysis, searching, sorting, filtering, displaying and reporting. Illustratively, the database may include data pertaining to all participants, including authors, reviewers, staff members and customers; instructional materials; the subject and corresponding grade level for each of the instructional materials; all sections of each of the instructional materials; the media for each of the instructional materials and each section of each of the instructional materials; the stage of completion of each section of each of the instructional materials; the time spent on each completed section; the author(s), reviewer(s) and other participants assigned to each of the instructional materials; the file name, path and file type for each component of each section of each of the instructional materials; the tangible components required for each of the instructional materials; and for each such component the quantity in stock, quantities ordered, quantities on backorder, expected delivery dates for ordered and backordered items, product code, size, weight, lot size, lot cost, delivery options and costs, unit cost for each such tangible component; ISBN and copyright information; payment information including fees, royalties and commissions.

A key aspect of a system and method according to principles of the invention is a module to manage creation of instructional materials. The module preferably includes a tool for soliciting authors and reviewers and evaluating applicants. The tool may be comprised of a web-based application form that prospective authors and reviewers may complete. The form may request contact information and information pertaining to the applicant's qualifications. The information may be stored in a database. Reports may be generated from the database to compare applicants side-by-side and/or seriatim. After an author is selected the author may be registered in the system using the registration procedure described above. The parties may enter into one or more contracts that address each party's commitments, including instructional material production, copyright ownership, payment and mentoring obligations. Thus, an exemplary method according to principles of the invention includes soliciting authors and reviewers, receiving applicant information online, generating reports to compare applicants, and selecting an applicant.

Detailed instructions for preparing instructional materials should be provided to the author. The instructions provide guidelines for the parts, length, organization and format of the instructional material. By way of example and not limitation, the instructions may require the instructional material to include the following sections/components:

Course introduction & standard alignments (PDF on CD)
    Introduction from the Author
    Author Overview
    Recommended Resources and Materials List
    User Instructions for Computer Readable Media (E.g., CD or DVD)
    Syllabus
    Pacing Guide
    Daily Lesson Plans
    Assessment Keys
    Teacher Version of Student Activity Book Class Notes (E.g., two versions, one in portable document format and MS PowerPoint™)
    Student Versions of Assessments (both word processor and portable document formatted versions on CD)
    Student Activity Book (portable document formatted version on CD)

Thus an exemplary method according to principles of the invention includes steps of providing detailed instructions to retained authors, setting forth in detail requirements for the materials to be created by the author. In so doing, the instructions help ensure a consistent framework for materials prepared by various authors for various courses.

A carefully designed syllabus and pacing guide should ensure that all required content is covered—a normally challenging ordeal, especially to those teachers who are out-of-field or who have not taught a course before. Daily Lesson Plans should go far beyond a mere recitation of the subject topics. They should include a variety of "point of use" supports for the teacher such as content vignettes; specific teaching strategies to assist in effective instructional delivery, and classroom management; lecture note support to guide classroom discussion and to provide examples of how to handle particularly challenging concepts; and procedural overviews that give tips on classroom management and in class work assignment, so as to ensure productive use of instructional time.

Specific lesson plan format includes Unit Overview (this only appears before the first day lesson of each unit) and the following elements:
  Topic: Lesson 1-1: Day 1 Give each day a topic here. Use heading 2 so this line will be included in table of contents
  Objective(s), skills attained & motivation (what will students know & be able to do)
  Homilies: add stories, setup or appropriate warm-up jokes that fit with this lesson.
  Homework
  Vocabulary: (OPTIONAL, depending on the course content)
  Procedure and Suggested Teaching Strategies (describe components of the lesson)
  Materials list
  Content Background/Lecture Support
  Application: (OPTIONAL, based on your teaching style)
  Assessment
  Wrap-up activity or filler (OPTIONAL)

Thus an exemplary method according to principles of the invention includes steps of preparing a syllabus, pacing guide and daily lesson plans.

A teacher version of a student activity book provides labs and activities that have been classroom-tested for effectiveness. Lab instructions for teachers should be clear and complete. Assessment keys are provided to assure that state and/or national standards are aligned to the course material. In an exemplary embodiment, teachers are assured that the course assessments accurately measure student progress. Class notes should be tightly correlated to the pacing guide and daily lesson plans to significantly reduce teacher preparation time. Thus, an exemplary method according to principles of the invention includes a step of preparing a teacher version of a student activity book.

Figure 2:
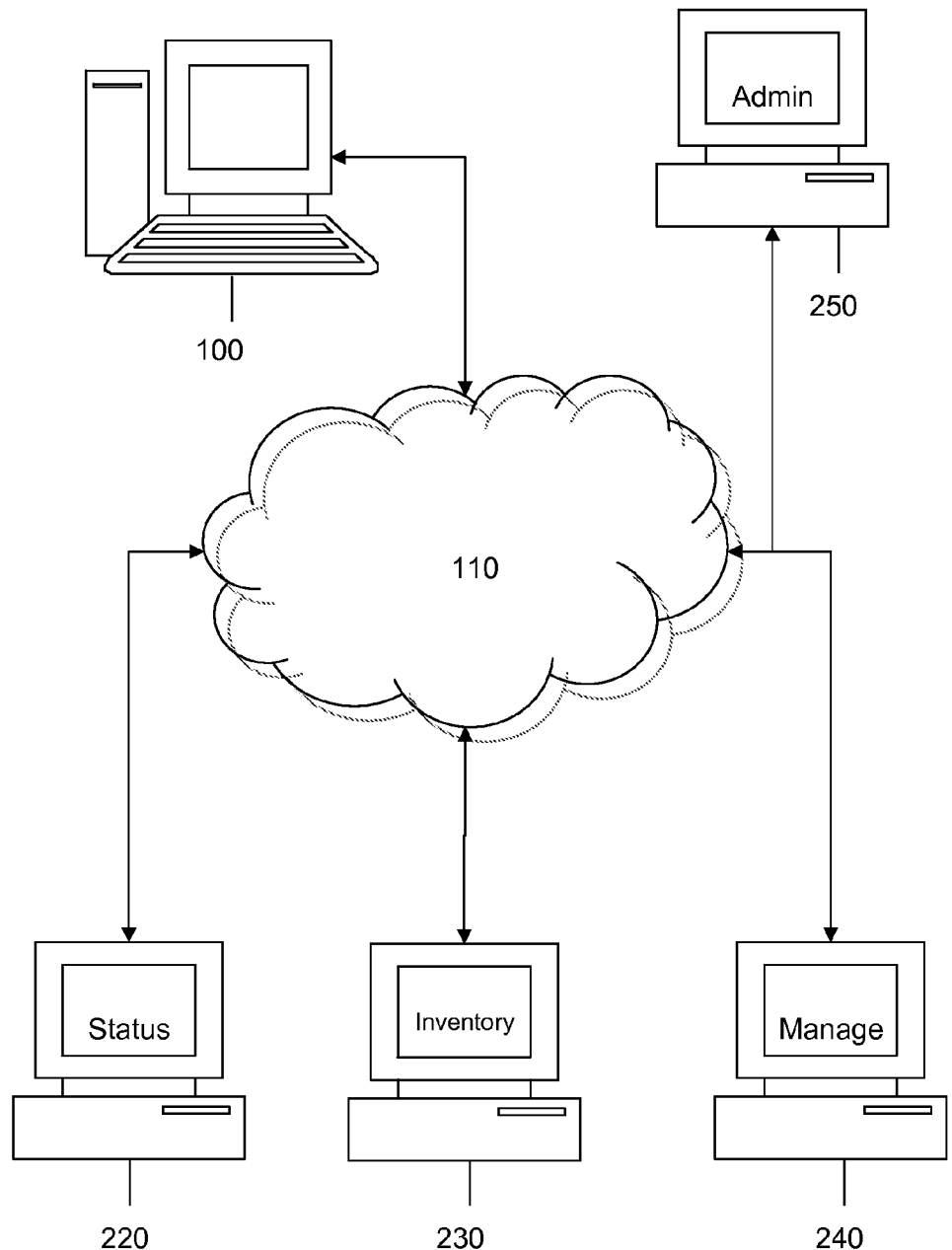
FIG. 2 is a high level block diagram of exemplary tracking and inventory modules for implementing a system and methodology in accordance with principles of the invention.

One or more applications comprised of various modules are used to manage processes according to principles of the invention. Illustratively, after an author has been selected, and entered the required agreement(s), and accepted an instructional material assignment, and accepted guidelines for preparing instructional material, the assignment commences and progress of the assignment is closely tracked. A tracking module identifies all participants assigned to an instructional material, the tasks for which they are responsible and the stage of completion of each task. Referring to FIG. 2, an administrative participant 250 may configure the tracking module by entering all participants assigned to an instructional material, the tasks for which they are responsible and the stage of completion of each task. As work progresses, stages of completion may be updated by the author, an administrative participant or some other participant who is responsible for maintaining the status information current. Status information may show percentage completion, percentage remaining and/or hours remaining for a task. Illustratively, the system may include a graphic user interface (GUI) with drop down lists and other form controls to facilitate entering status information. All status information is stored in the database for subsequent access, use and reporting.

The time required to produce each of the instructional materials is also tracked and stored in the database. Such information may be used to estimate when a production run will be completed so that the instructional materials are available for shipment.

Thus, an exemplary method according to principles of the invention includes a step of tracking creation of instructional materials, including stages of completion, percentage completion, percentage remaining and/or hours remaining for a task.

In addition to tracking the creation of instructional materials, a system according to the principles of the invention may optionally include one or more inventory modules. As shown in FIG. 2, a responsible participant 230 may monitor and update an inventory of instructional materials available for shipping to customers. The module may notify the participant if inventory drops below a determined level, so that additional instructional materials may be produced. In addition to notifying the responsible participant, a notification module may also automatically schedule a production run. Thus, an exemplary method according to principles of the invention includes a step of tracking inventory of instructional materials available for shipping to customers.

As supplies such as paper, covers, binders, tabs and the like are required to produce instructional materials, an inventory module may also track supplies. The database may store a description of each supply; and for each such supply the quantity in stock, quantities ordered, quantities on backorder, expected delivery dates for ordered and backordered items, product code, size, weight, lot size, lot cost, delivery options and costs, and unit cost for each such supply. Using the inventory module, a responsible participant may readily determine if sufficient supplies are available for a production run for an instructional material. As the database includes vendor, pricing and delivery information for each supply, supplies may be ordered as needed. Thus, an exemplary method according to principles of the invention includes a step of tracking inventory of supplies such as paper, covers, binders, tabs and the like, as required to produce instructional materials.

Referring still to FIG. 2, a manager 240, such as an executive with super-user privileges, may access all aspects of the system. This accessibility enables a manager 240 to oversee operations.

Figure 3:
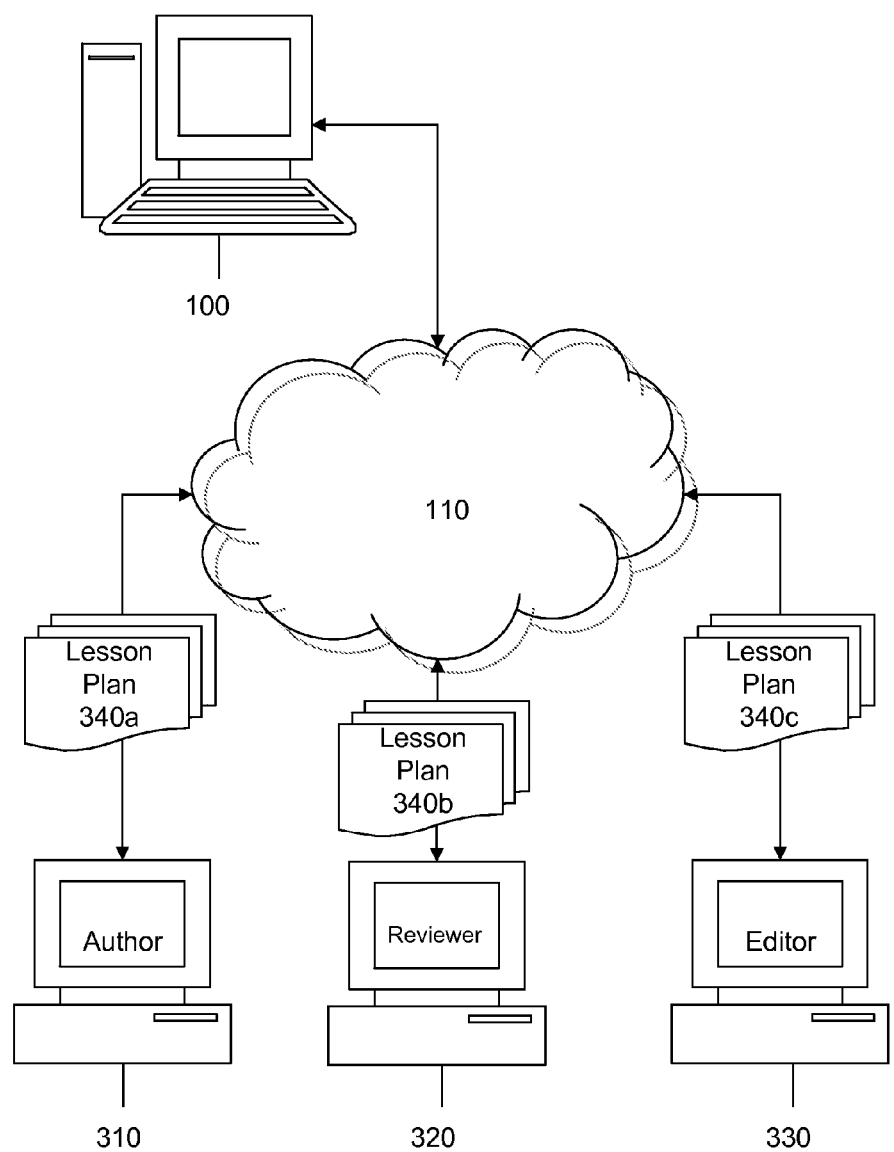
FIG. 3 is a high level block diagram of an exemplary instructional material development module for implementing a system and methodology in accordance with principles of the invention.

Referring now to FIG. 3, a block diagram illustrating an instructional material creation methodology according to principles of the invention is shown. An iterative process involving several participants is employed. Various steps of the process are described below. An author 310, who was selected because of his or her expertise and desire to produce an instructional material, prepares drafts of the instructional material 340a. During editing passes, an assigned editor 320 produces edited versions 340b of each draft instructional material. During academic review, one or more peers 330 review the work and provide feedback in a peer reviewed version of the instructional material 340c. The author 310 responds to the peer review and produces a final draft of the document. During final review, an editor (e.g., a managing editor) completes a final examination and ensures that instructional material, including text formatting, file organization, nomenclature and graphics, are production ready. The instructional material becomes final after this step is complete. At the end of this iterative process, the work product includes one original version, and several edited versions, with the last edited version being the final version. In a preferred implementation, all versions of the instructional material are archived for future reference. The final version is identified as production ready and used for producing the instructional materials.

Thus, an exemplary method according to principles of the invention includes steps of preparing draft instructional material, editing each draft of the instructional material, performing academic (peer) review and providing feedback in a peer reviewed version of the instructional material, producing a final draft of the instructional material, and performing a final editorial examination to ensures that the instructional material, including text formatting, file organization, nomenclature and graphics, are production ready.

Figure 4:
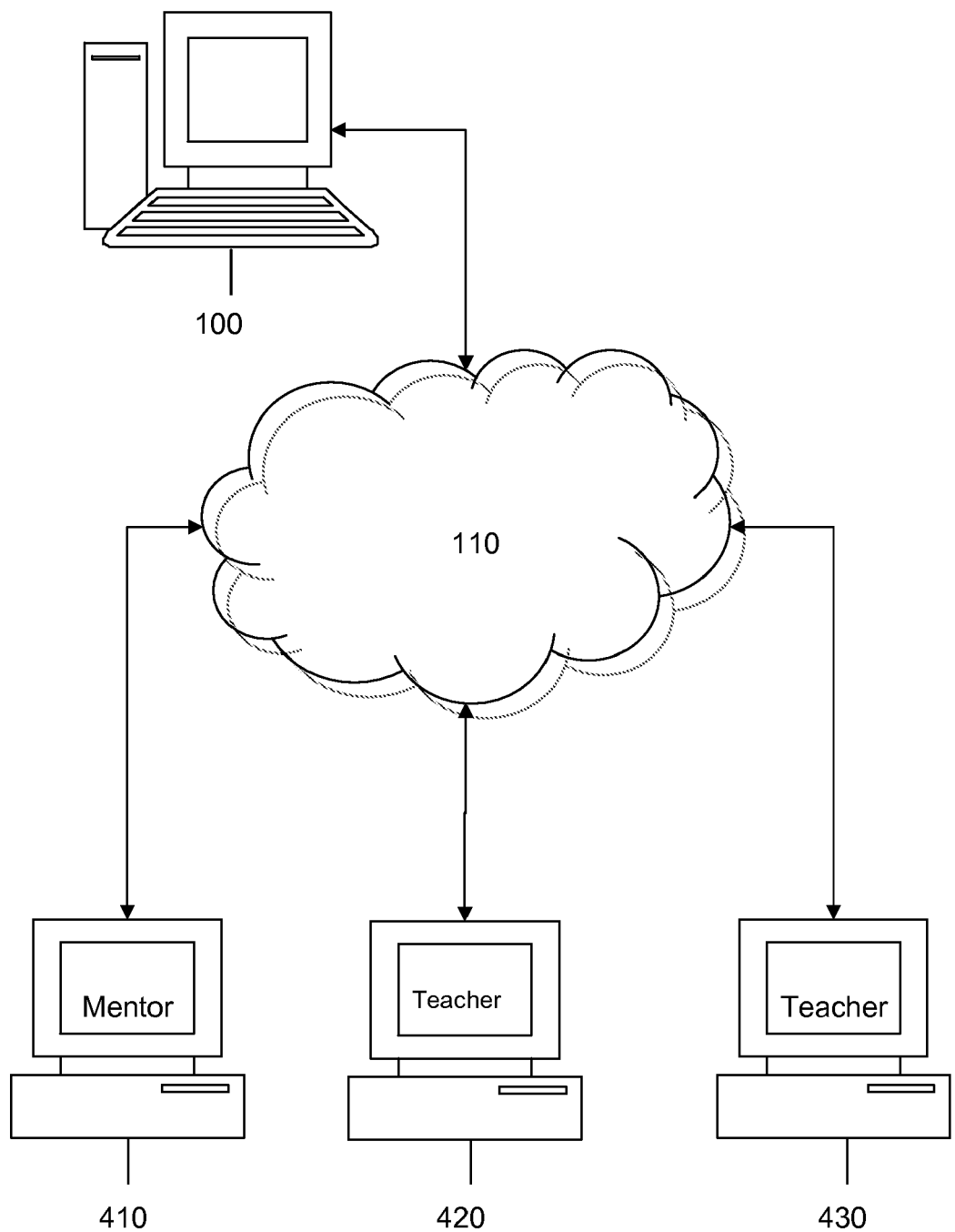
FIG. 4 is a high level block diagram of an exemplary mentoring module for implementing a system and methodology in accordance with principles of the invention.

Referring now to FIG. 4, a block diagram illustrating a mentoring methodology according to principles of the invention is shown. An instructional material's author, who is an expert that is quite familiar with the instructional material and subject, or someone equally well acquainted with the material serves as a mentor 410. One or more mentors may be made provided. In a preferred implementation, the author of an instructional material contractually agrees to provide mentoring support as a condition for the right to produce the instructional material. However, others who are highly qualified in the subject area and well acquainted with the instructional material, but who are not an author of the instructional material may be used in addition to, or in lieu of the author.

Mentoring support is comprised of consultations. The consultations may be provided via telephone, telefacsimile, electronic mail, instant messaging, and/or text messaging, and/or other forms of electronic communication that are now known or later developed.

Through mentoring, a teacher-mentor 410 with expertise in the subject and familiarity with the instructional material is made available to provide support to teachers 420 and 430 who use the instructional material. The support may include filling in gaps and providing clarifications. Thus, an exemplary method according to principles of the invention includes a step of providing mentoring support for educator end-users of the instructional materials.

Optionally, an indexed and searchable frequently asked questions resource accessible to teachers who use the instructional material 420 and 430 may also be provided, such as on the server. The resource may be comprised of questions previously posed by teachers and answers by a mentor. This frequently asked question resource provides another tool for facilitating teaching in accordance with the instructional material.

Figure 5:
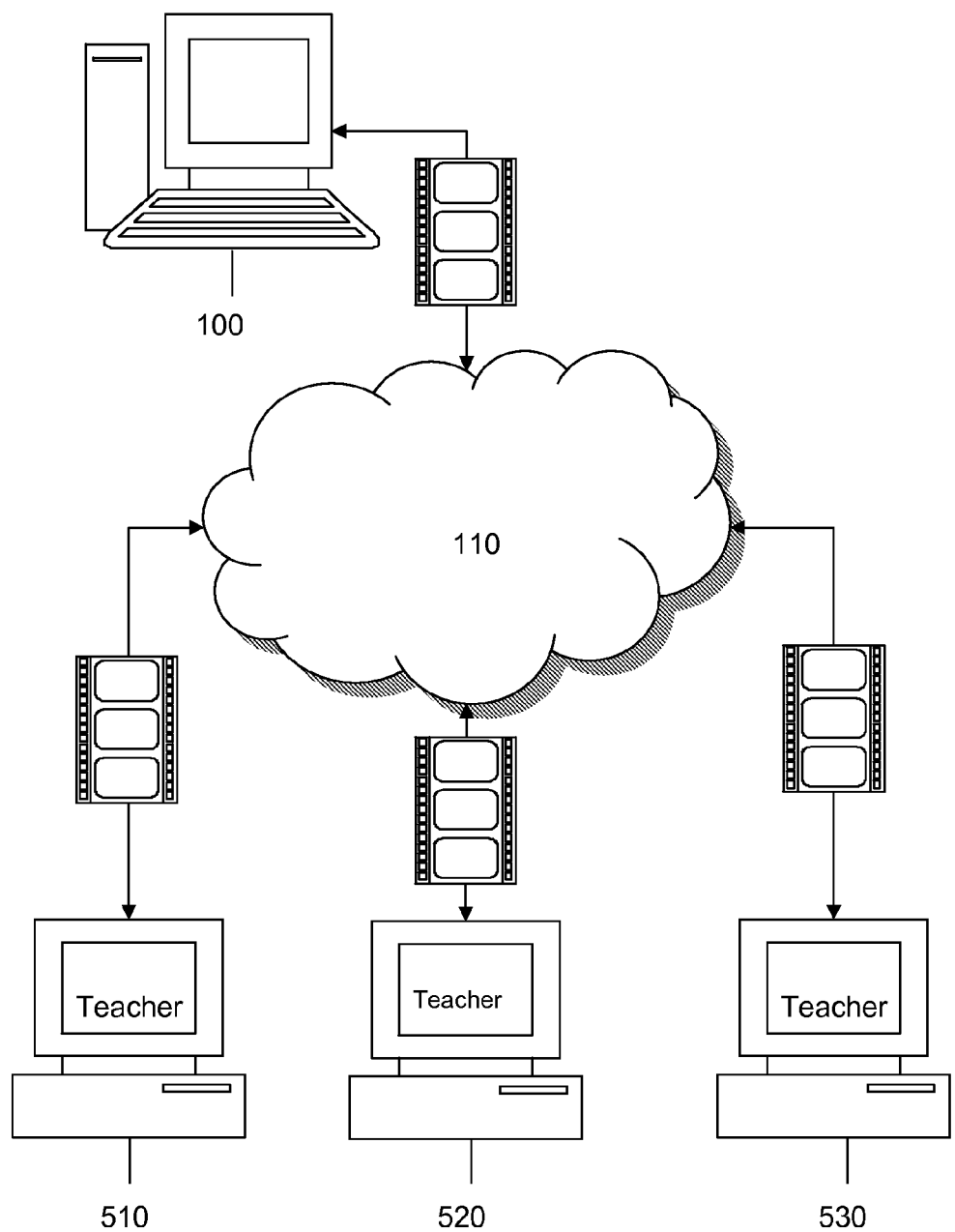
FIG. 5 is a high level block diagram of an exemplary online course module for implementing a system and methodology in accordance with principles of the invention.

Referring now to FIG. 5, a block diagram illustrating a course delivery system and methodology according to principles of the invention is shown. Inexperienced teachers and instructors who are teaching outside their area of expertise may benefit greatly from supplemental training. They may also become highly qualified under No Child Left Behind HOUSSE certification procedures, or other federal and state guidelines, through successful completion of these courses. In a preferred embodiment, the system provides a course on teaching a subject according to an instructional material. Each course may include video, audio, multimedia and/or other materials. In the cases of audio and video, the course materials may be streamed to teachers upon demand, or provided to teachers 510-530 via a download and store methodology.

Courses are preferably taught by experts, most likely faculty of accredited universities. This could include an instructional material author, who is an expert quite familiar with the instructional material and subject, or someone who is equally qualified and well acquainted with the material may serve as a course instructor.

Figure 6:
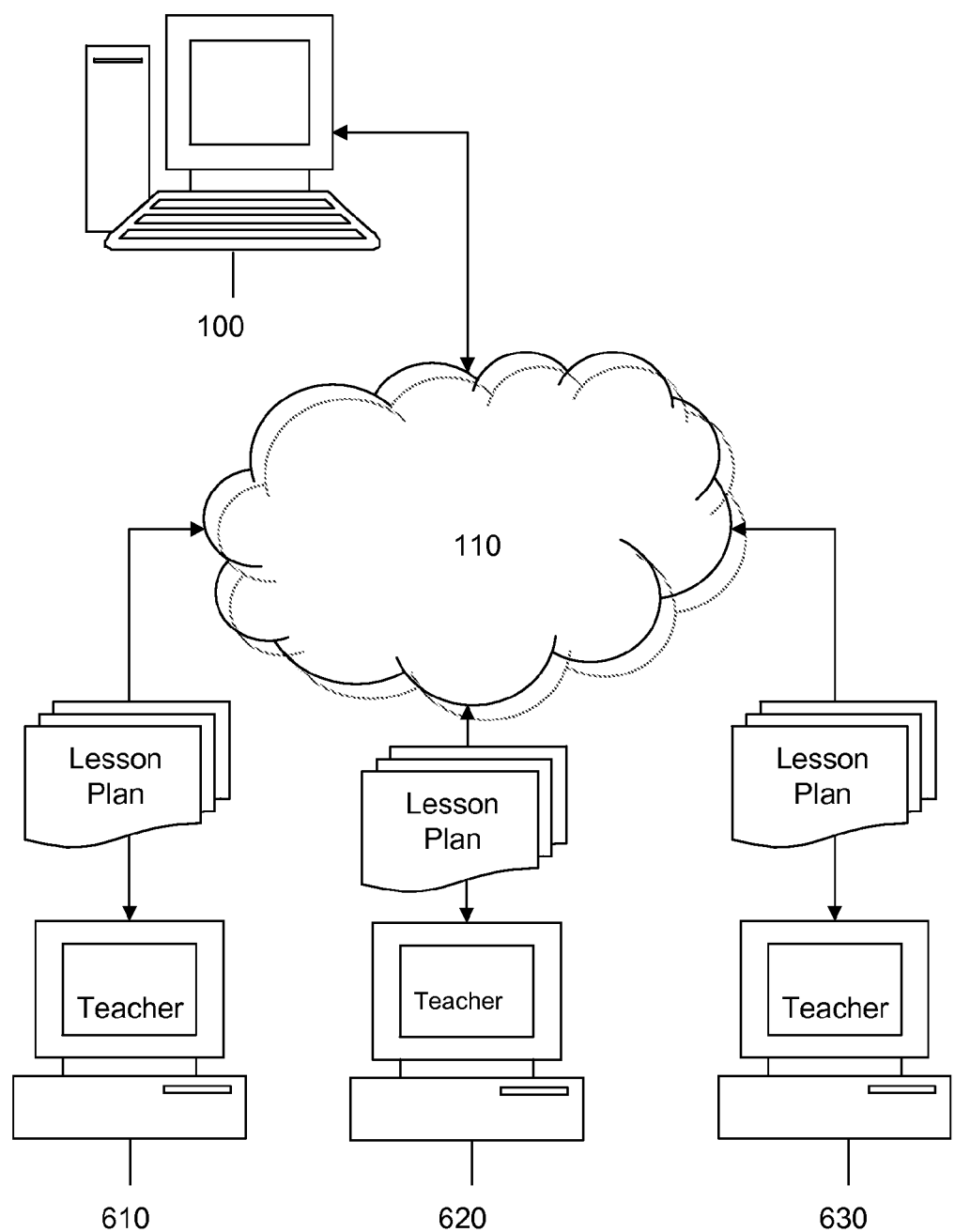
FIG. 6 is a high level block diagram of an exemplary instructional material delivery module for implementing a system and methodology in accordance with principles of the invention.

Referring now to FIG. 6, a block diagram illustrating an instructional material delivery system and methodology according to principles of the invention is shown. Instructional materials may be supplied to customers (e.g. teachers, schools and/or school districts) via physical delivery of hard copies and/or by electronic delivery. Orders may be placed online using a web-based ordering system. The ordering module may communicate orders with the inventory management module described above to reduce inventory quantities as instructional materials are sold and to apprise customers of availability of instructional materials. Thus, an exemplary method according to principles of the invention includes a step of delivering instructional materials to end-user educators in hard copy and/or electronic form.

A system according to principles of the invention may also include a testing module to assess whether a teacher is qualified to teach a course. The testing module may include an application that requires a teacher to specify his or her state, subject, education, experience and the like. Based upon this input, the module may determine if the teacher meets the "highly qualified" standard under the NCLB, without a test. If a teacher is highly qualified, testing may be unnecessary. Thus, an exemplary method according to principles of the invention includes assessing whether a teacher is qualified to teach a course based upon a teacher's education, experience and the like.

Figure 7:
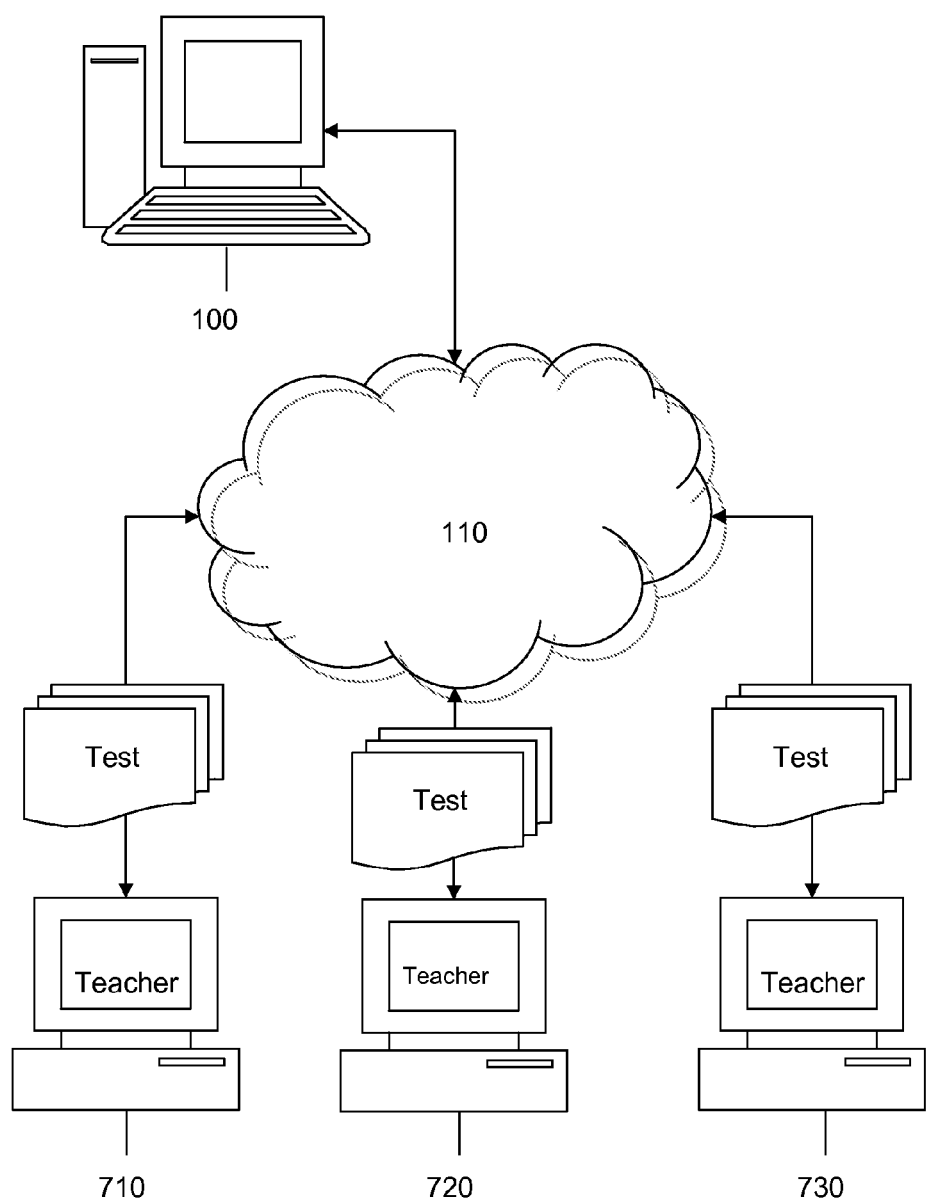
FIG. 7 is a high level block diagram of an exemplary testing module for implementing a system and methodology in accordance with principles of the invention.

Referring to FIG. 7, testing may be administered in a proctored location. A test may be offered through testing centers in a closed book fashion. The test is designed to determine if a teacher is "highly qualified", as contemplated by the NCLB through the HOUSSE certification program or similar federal or state teacher credentialing programs. Thus, the test should cover matters pertaining to a subject and teaching the subject. Test scores may be sent directly to a tested teacher and/or other entities and agencies responsible for ensuring that a teacher is highly qualified and meets appropriate federal or state credentialing requirements for the subject. Thus, an exemplary method according to principles of the invention includes testing a teacher to determine whether the teacher is qualified.

Referring now to FIGS. 8 through 14, exemplary process step descriptions are provided for the database. The exemplary steps correspond to various processes, including the processes described above. An order 810, name 820, id 830 and time estimate 840 are provided for each step. The information may be used to define stages of completion and determine time for completion. The steps may include:

Create course list
    Create course codes
    Domain name(s) secured
    Author Invitation Email
    Author Form filled out on web site by Author
    Author resume received
    Author samples received
    Send Royalty Agreement (Agreement for Author) with course file names
    Completed royalty agreement received
    Royalty agreement accepted Copy of accepted royalty agreement sent to author with cover note (original filed with company)
Author email, ftp folder, login and password created
Staff Form completed
New Product Form completed Custom templates created with course file names
Welcome email sent to author with custom file named templates and handbook
Subject relevant sample notebook, CD and student book and author handbook sent to author
Standard Alignment
Tech Support, Q&A, general assistance sessions
Author writes book, composes add-on files, multimedia, etc.
Create custom "Intro" page from template with author's letter
Author uploads all tabs files of "unit 1" book text (& other associated files) to FTP site Assign Content/Format-Editor (C/F-Editor)
C/F-Editor downloads all files from FTP site & performs editing tasks
Author makes changes, posts updates to FTP site with R2 nomenclature
C/F-Editor downloads all files from FTP site & performs editing tasks
C/F-Editor posts changes to FTP site with R3 nomenclature & contacts author
Author makes changes, posts updates to FTP site with R4 nomenclature
C/F-Editor downloads all files from FTP site & performs editing tasks 12° C./F-Editor posts contacts author changes to FTP site with R5 nomenclature & Author makes changes, posts updates to FTP site with R6 nomenclature
C/F-Editor composites Tab 0a & b into Tab 0 creates PDF files for Tabs 0-6° C./F-Editor composites Tab 1a, b & c into Tab 1
C/F-Editor creates PDF thumbnails (e.g., 6 slides per page) from all .ppt's & inserts at end of Tab 4
C./F-Editor creates addition to Tab 4 Word doc with PPT titles
C/F-Editor creates individual Tabs 0-6 PDF files (using Allied PDF), stores in printer folder
C/F-Editor compares all source docs to PDF versions & corrects problems
Author ensures that the Word Docs & PDF's match and signs off (in email)
Author reviews printed proof copy & signs off (in email) that the book is acceptable
C/F-Editor adds TOC bookmarks to all PDF files
Academic Review Board members and a leader are chosen
Academic Review Board sent course material
Academic Review Board corrects files and sends preliminary report to TP
TP sends ARB correction report to Author
Author delivers corrected files to TP
TP sends corrected files to ARB
ARB signs off on Author response and delivers final review
Book goes to Production Stage
Create source artwork
Create book covers
Create book spine
Create workbook covers
Create grayscale images of notebook cover
Create Web Page
Add Shopping Cart Functionality
Create course folders and sub-folders for Autoplay: CD SubsVer, CD ClassVer, Covers, Word files, PPT, Printer
Create CD autorun background image (.bmp)
Create CD label—SubVer
Create CD label—ClassVer
Place Tab 0 PDF files in SubVer CD Burn Folder
Place PPT files in SubVer and ClassVer CD Burn Folder
Assign Password for PDF and Word files
Password protect Tab 2, 4, 5 and 6 PDF; 2 and 5 Word files and copy in SubVer CD Burn Folder
Copy Tab 0, 2, 4, and 5 PDF, Word docs 2 and 5 to ClassVer CD Burn folder
Create CD autorun packages for SubVer and ClassVer
Modify revision date on CD labels, then print and stomp CD Labels
Create CD ISO image—SubVer
Create CD ISO image—ClassVer
Burn product CDs from ISO—SubVer
Burn product CDs from ISO—ClassVer
Test all links on first-run product CD—SubVer
Test all links on first-run product CD—ClassVer
Product book source are taken to Printer
Manager Editor reviews proof copy of printed book
Printer prints & binds the 1st copy for proofing
Printing & binding mass production at Printer #1
Taking Orders
Modifications to all tab 0 doc's & reformat to newest revision of templates
Convert (merge) authors' content format to MS-Word (from PageMaker, Tex, etc.)
Modify all references to the book/product title
Authors' content changes, all documents
Re-edit all documents to match the newest revision of the templates
Re-create PDF files/merge documents/resolve issues
Final Proof (compare PDF's to source documents & resolve discrepancies)
Create grayscale versions of cover images
Create new 2-up workbook cover files to save paper
Revise Autoplay menu to point to only files that are on the CD (not Tab 1&3)
Create separate Autoplays & ISO images for Subscr. & Classroom. Set versions
Reduce the size of the CD label image files (using graphics software)
Put rev. date and ISBN # onto the CD labels (Subscr. and Classroom Set versions)
Modify all CD labels (regarding subscription & included-file verbiage)
Revise Autoplay menu title-bar to add or correct the Teaching-Point URL
Add tabs 5 and 6 files (Word & PDF) into CD Burn folders, Autoplay menus
Add Adobe bookmarks (links) similar to TOC for all PDF files
Remove pointless software plug-ins from Windows version of Autoplay
Re-create & test all ISO images with a single directory path for add-on reader pgm files
Create Macintosh version of Autoplay for all products
Replace Windows version of Acrobat Reader (ar505enu.exe) to v6 (or latest version) in all products
Replace Macintosh version of Acrobat Reader (ar505enu.bin) to latest version in all products
Replace Windows version of PowerPoint Viewer '97 to latest version in all products 23

Replace Macintosh version of PowerPoint Viewer '98 to latest version in all products Capture page count (all sections, all books) & put into Product Profile DB Put page counts onto website To guard against unauthorized access, use, copying and distribution, in a preferred implementation, a protection mechanism for contents/courseware developed and distributed via network or on a computer readable medium (e.g., a CD) is also provided. Content (e.g., some or all files and/or clusters of files) is encrypted so that it can only be decoded, viewed and printed using an encryption key. The key may be kept secret and stored on a remote server controlled by the publisher. The key may be required for each session. In order to access to the key, a valid registered account and network access may be required. Additionally, a medium-dependent or machine-dependent unlock key may be required. The registration process may produce one or more unlock keys using information about the specific configuration of the hardware on which the content is installed and/or used, for example by hashing a MAC address with an identification number specific to a license or serial number.

Figure 15:
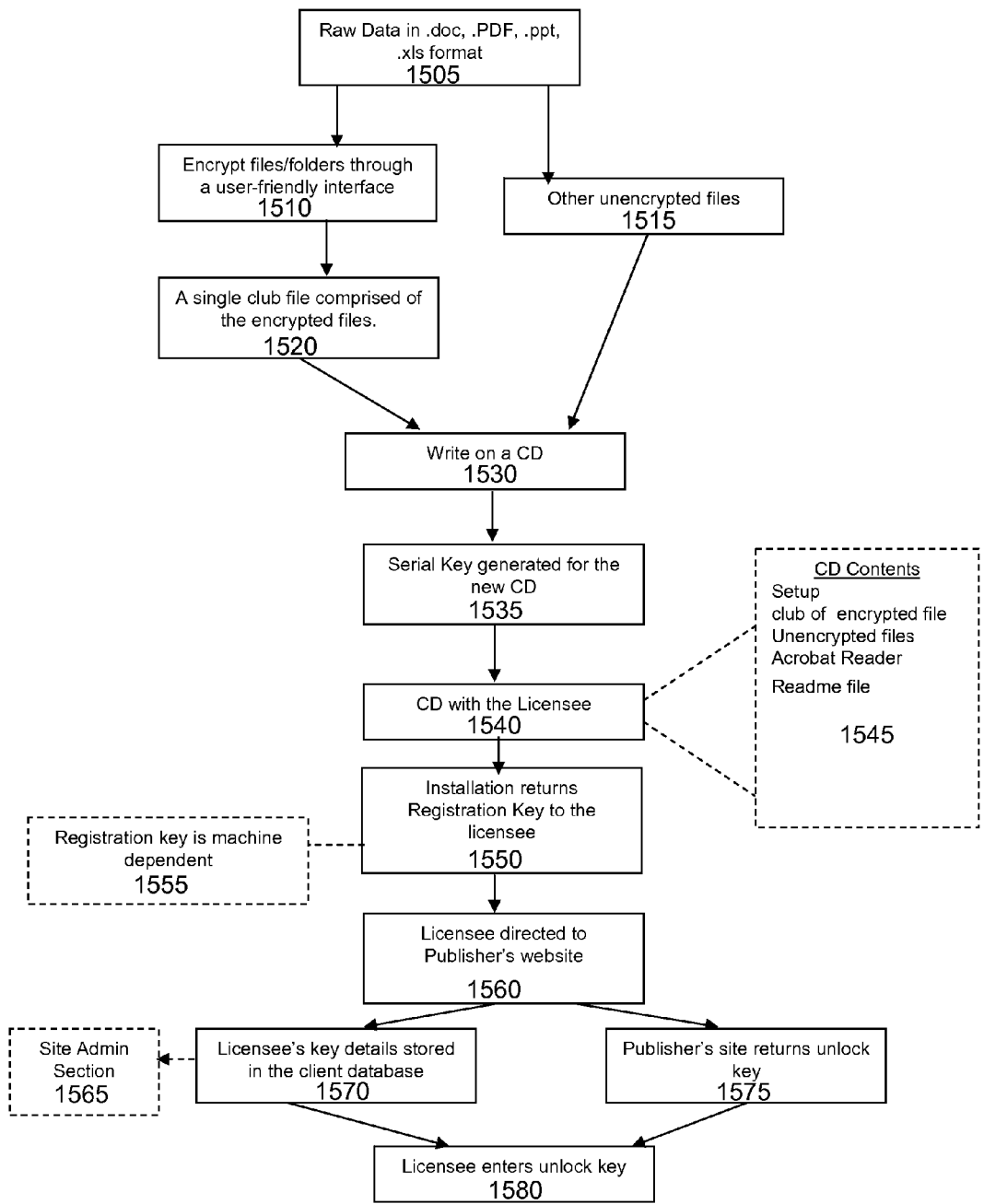
FIGS. 15 and 16 are flowcharts illustrating steps of an exemplary digital rights management process according to principles of the invention.
Figure 16:
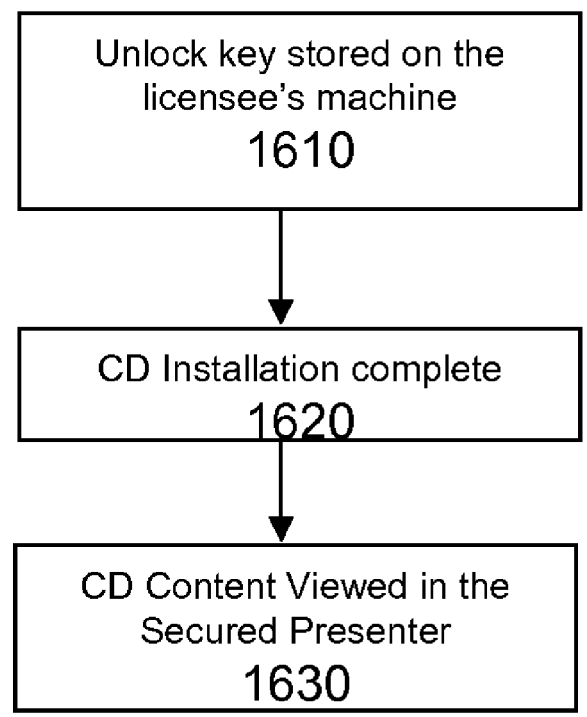

By way of example, and not limitation, with reference to FIGS. 15 and 16, raw data 1505 may be encrypted 1510 into a single file 1520 and stored with other unencrypted files 1515, as well as a reader program and readme file 1545, on a storage medium (e.g., a CD-ROM) 1530. Then a serial key is generated for the medium 1535, which is provided to an end-user (e.g., licensee) 1540. Installation returns a machine dependent registration key 1555 to the licensee 1550. Data pertaining to the licensee is stored in the publisher/provider's client database 1570, which may be accessible from a site administration section 1565 of the publisher's website 1560. An unlock key may then be communicated to the Licensee 1575, enabling unlocking (decrypting) of the encrypted file 1580. After the unlock key is provided 1610, it may be stored on the licensee's computer 1620 and utilized to enable access to the unencrypted content 1630.

Additionally, one or more watermarks, e.g., hidden copyright or other verification messages, may optionally be embedded in the content. Thus, a protection mechanism may check if a product corresponding to a watermark has been registered and if the registered product is being used on the computer for which it was registered.

Furthermore, use and access may be time limited. By way of illustration, access to a key may be limited to a determined time period or number of access attempts.

An exemplary system and methodology according to principles of the invention is described above. Those skilled in the art will appreciate that additional steps and modules may be provided without departing from the scope of the present invention. Additionally, steps and modules may be combined, certain steps and modules may be omitted and the order of certain steps and organization of modules may be changed without departing from the scope of the present invention.

While an exemplary embodiment of the invention has been described, it should be apparent that modifications and variations thereto are possible, all of which fall within the true spirit and scope of the invention. With respect to the above description then, it is to be realized that the optimum relationships for the components of the invention and steps of the process, including variations in form, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A computer-implemented professional development system for teachers, said system including a computer system having a database and a plurality of subject-specific instructional materials, each of said instructional materials including a syllabus, a pacing guide, a plurality of daily instructional materials, assessments, a student activity book, a teacher version of the student activity book, and class notes, said computer-implemented professional development system further comprising:

a first computer implemented module for managing the selection of authors of said subject-specific instructional materials including an interface for receiving applicant information online using said computer system, a report generator generating a report to compare applicants for selecting an applicant as an author using said computer system, an instruction communicator for providing detailed instructions to a selected applicant using said computer system, said detailed instructions setting forth in detail requirements for materials to be created by the selected applicant;

a second module for managing the creation of said subject-specific instructional materials, said second module comprising a tracker configured to track creation of instructional materials, including stage of completion, percentage completion, and time remaining for a task using said computer system;

and a third module for managing inventory of said subject-specific instructional materials, said third module comprising a tracker configured to track inventory of instructional materials available for shipping using said computer system.

2. A computer-implemented professional development system for teachers, according to claim 1, said third module for managing inventory of subject-specific instructional further comprising a module for managing inventory of material supplies using said computer system.

3. A computer-implemented professional development system for teachers, according to claim 2, said system further including a module for subject-specific mentoring teachers using said computer system.

4. A computer-implemented professional development system for teachers, according to claim 3, said system further including a module for managing creation of instructional materials using said computer system.

5. A computer-implemented professional development system for teachers, according to claim 4, said system further including a module for delivering subject-specific courses online using said computer system.

6. A computer-implemented professional development system for teachers, according to claim 5, said system further including a module for testing teachers using said computer system.

7. A computer-implemented professional development system for teachers, according to claim 6, wherein the instructional materials include encrypted data and said system further includes a decryption key for said data, said encryption key being made accessible only to authorized users.

* * * * *